US008933778B2

(12) United States Patent
Birkel et al.

(10) Patent No.: US 8,933,778 B2
(45) Date of Patent: Jan. 13, 2015

(54) MOBILE DEVICE AND KEY FOB PAIRING FOR MULTI-FACTOR SECURITY (71) Applicant: Intel Corporation, Santa Clara, CA (US)

(72) Inventors: Steven Birkel, Portland, OR (US); Rita Wouhaybi, Portland, OR (US); Tobias Kohlenberg, Portland, OR (US); Stanley Mo, Hillsboro, OR (US); Joni D. Stutman, Blue Bell, PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/631,440

(22) Filed: Sep. 28, 2012

(65) Prior Publication Data

US 2014/0091903 A1 Apr. 3, 2014

(51) Int. Cl.
*G08C 19/00* (2006.01)
(52) U.S. Cl.
USPC .......................................................... 340/5.54
(58) Field of Classification Search
CPC ..... B60R 25/24; H04W 4/02; B60L 11/1824; H04M 3/436; H04M 3/53
USPC ........ 340/5.54, 5.61, 5.8, 3.1, 5.72; 307/10.2, 307/10.1
See application file for complete search history.

(56) References Cited

U.S. PATENT DOCUMENTS

| 7,375,440 | B2 * | 5/2008 | Suyama et al. | 307/10.2 |
|---|---|---|---|---|
| 7,474,199 | B2 * | 1/2009 | Nakashima et al. | 340/426.1 |
| 2001/0038328 | A1 * | 11/2001 | King et al. | 340/5.64 |
| 2003/0163739 | A1 | 8/2003 | Armington et al. | |
| 2007/0186106 | A1 | 8/2007 | Ting et al. | |
| 2008/0119977 | A1 | 5/2008 | Beuter | |
| 2008/0312782 | A1 | 12/2008 | Berdichevsky et al. | |
| 2010/0033312 | A1 | 2/2010 | Chauncey et al. | |
| 2010/0222939 | A1 * | 9/2010 | Namburu et al. | 701/2 |
| 2011/0316669 | A1 * | 12/2011 | McBride et al. | 340/5.72 |

OTHER PUBLICATIONS

International Search Report and Written Opinion dated Dec. 17, 2013 from International Application No. PCT/US2013/059873.

* cited by examiner

Primary Examiner — Vernal Brown
(74) Attorney, Agent, or Firm — Jordan IP Law, LLC (57) ABSTRACT Systems and methods may provide for determining a first proximity status of a first mobile device with respect to a vehicle, and determining a second proximity status of a second mobile device with respect to the vehicle. Additionally, an accessibility of one or more functions of the vehicle may be configured based at least in part on the first proximity status and the second proximity status. In one example, a policy associated with one or more of the first mobile device and the second mobile device may be identified, wherein the accessibility is configured further based on the policy.

29 Claims, 5 Drawing Sheets

MOBILE DEVICE AND KEY FOB PAIRING FOR MULTI-FACTOR SECURITY

BACKGROUND

Embodiments generally relate to security systems. More particularly, embodiments relate to the use of multiple factors to control access to vehicles.

Vehicle entry systems may include proximity-based keyless remotes (e.g., key fobs) that may be used to access and/or start the vehicle. While these solutions may be suitable under certain circumstances, there remains considerable room for improvement. For example, unauthorized access and/or operation of the vehicle may be achieved by simply gaining possession of the key fob, which may be the sole user authentication factor with respect to the vehicle. Moreover, if the key fob is lost or stolen, a new key fob may need to be ordered, which may be of considerable cost, delay and inconvenience to the owner. Although certain smart phone applications may allow remote control of vehicles, these applications may also be limited to the use of login credentials to establish the phone as the only user authentication factor with respect to the vehicle, wherein the login credentials may be easily compromised. Moreover, smart phone-based solutions may involve the use of an intermediary (e.g., service provider) between the phone and the vehicle.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
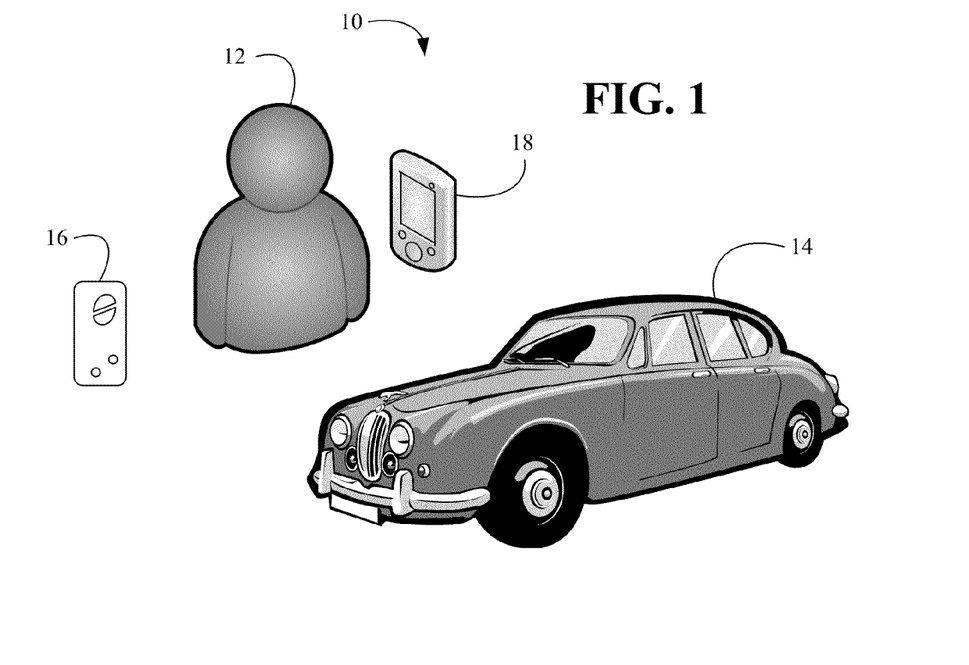
FIG. 1 is a block diagram of an example of an authentication environment according to an embodiment.

Turning now to FIG. 1, an authentication environment 10 is shown in which access to and control over a vehicle 14 is managed relative to a plurality of mobile devices 16, 18 that are paired with the vehicle 14. In the illustrated example, a first mobile device 16 is a key fob (e.g., wireless hardware security token) and a second mobile device 18 is a smart phone. The mobile devices 16, 18 may also include other types of devices such as smart tablets, personal digital assistants (PDAs), media players, imaging devices, and so forth, wherein a user 12 may carry the mobile devices 16, 18 with him or her as the user approaches and interacts with the vehicle 14. As will be discussed in greater detail, the presence of the mobile devices 16, 18 may be required in order to authenticate the user 12, wherein successful authentication may result in certain functions of the vehicle 14 being made available to the user 12. For example, the presence of both mobile devices 16, 18 may be required before the user 12 is permitted to access the vehicle 14 (e.g., door and/or trunk unlock function), start the vehicle 14 (e.g., ignition function), customize various settings (e.g., user setting function), drive the vehicle 14 (e.g., vehicle operation function), pair devices with the vehicle 14 (e.g., device pairing function), and so forth. Accordingly, the illustrated environment 10 represents a "multi-factor" authentication environment in which the security of the vehicle 14 is a function of the proximity status of multiple mobile devices 16, 18.

As will also be discussed in greater detail, user policies and/or profiles may also be used to make certain functions, such as vehicle access and device pairing, available to the user 12 even if only one of the mobile devices 16, 18 is present. Additionally, although two mobile devices are shown, more than two mobile devices may also be used by a given user to access vehicle functions. For example, the user 12 may pair a smart phone, smart tablet and media player with the vehicle 14, and designate the smart phone as the primary (e.g., "master") device, wherein the primary device may be used to pair other devices with the vehicle 14.

Figure 2A:
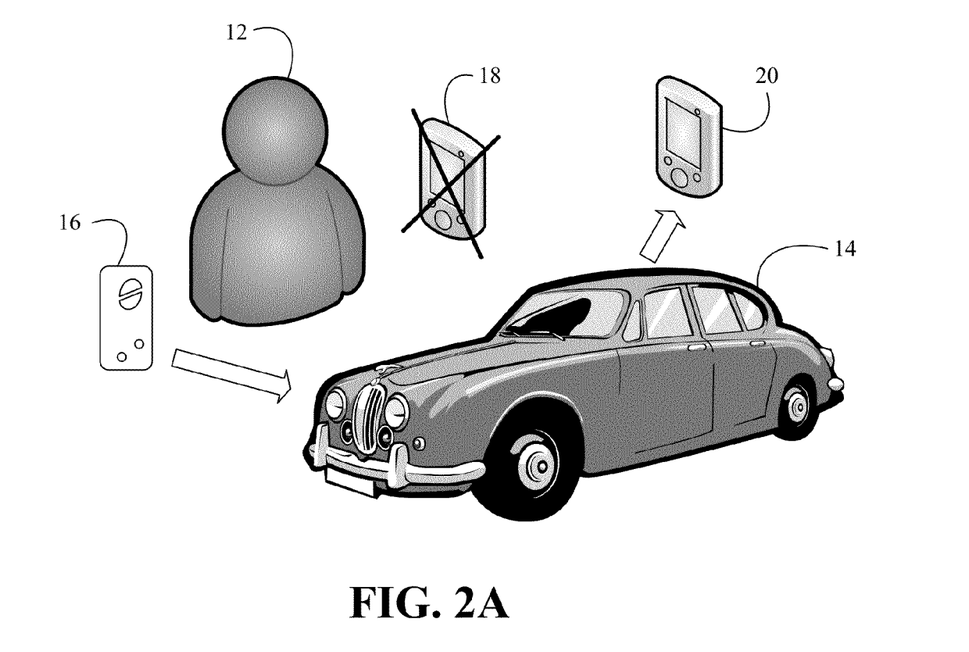
FIGS. 2A and 2B are block diagrams of examples of factor replacement scenarios according to embodiments.

For example, FIG. 2A demonstrates that a policy may be implemented in which the user 12 is permitted to enter the vehicle 14 if the first mobile device 16 is present but the second mobile device 18 is not present. Such a case might occur if the second mobile device 18 becomes lost or stolen, or the user 12 merely forgets to bring the second mobile device 18. The policy, which may be implemented as a user profile corresponding to the user 12 or as a global policy (e.g., default profile) applicable to all users or groups of users, may also permit a replacement device 20 (e.g., smart phone) to be paired with the vehicle 14, provided that the user 12 successfully satisfies a login constraint (e.g., inputs a predefined passcode) associated with the user profile of the user 12 and completes a pairing process.

Figure 2B:
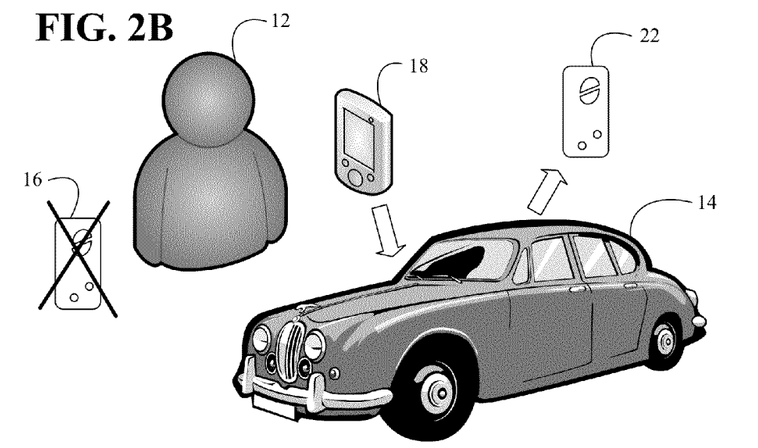

Similarly, FIG. 2B demonstrates that the user profile may permit the user 12 to enter the vehicle 14 if the second mobile device 18 is present but the first mobile device 16 is not present. Such a case might occur if the first mobile device 16 becomes lost or stolen, or the user 12 merely forgets to bring the first mobile device 16. The user profile may also permit a replacement device 22 (e.g., key fob) to be paired with the vehicle 14, provided that the user 12 successfully satisfies the login constraint associated with the user profile of the user 12 and completes the pairing process. Accordingly, the use of a multi-factor authentication scheme may enable new factors to be paired with the vehicle 14 at considerably less cost, delay and inconvenience to the user 12, while maintaining a relatively high level of security with respect to the vehicle 14.

Figure 3:
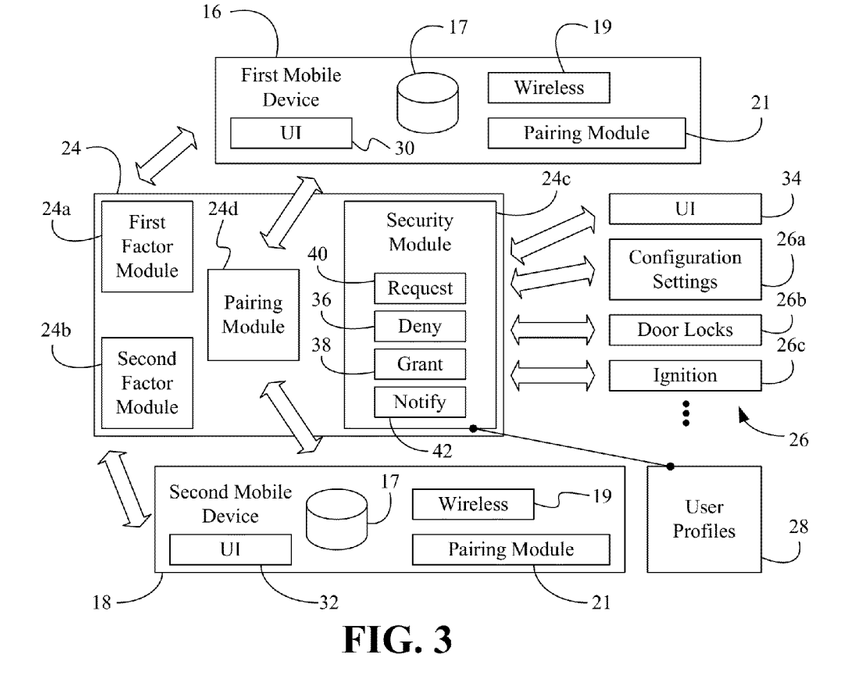
FIG. 3 is a block diagram of an example of a logic architecture according to an embodiment.

Turning now to FIG. 3, a logic architecture 24 (24a-24d) is shown, wherein the logic architecture 24 may be generally incorporated into a vehicle such as, for example, the vehicle 14 (FIGS. 1, 2A and 2B) as hardware, software, firmware, or any combination thereof. In the illustrated example, a first factor module 24a uses a proximity sensor (not shown) to determine a first proximity status of the first mobile device 16 with respect to the vehicle. Similarly, a second factor module 24b may user a proximity sensor to determine a second proximity status of the second mobile device 18 with respect to the vehicle. A security module 24c may have a request component 40 that receives a user request via a user interface (UI) 30 (e.g., pushbutton, switch, etc.) of the first mobile device 16, a UI 32 (e.g., touch screen, microphone, etc.) of the second mobile device 32, a UI 34 (e.g., door handle, pushbutton, touch screen, etc.) of the vehicle, etc., and configure an accessibility of one or more functions 26 (26a-26c) of the vehicle in response to the user request based at least in part on the first proximity status and the second proximity status. In one example, the security module 24c identifies a policy such as one or more user profiles 28, wherein at least one of the user profiles 28 may be associated with the first mobile device 16 and/or the second mobile device 18 (and a user corresponding to such device(s)). In such a case, the vehicle functions 26 may be configured further based on the identified user profile.

For example, the security module 24c might have a denial component 36 that denies user requests if the first proximity status and the second proximity status do not satisfy a multi-factor condition of the user profile. More particularly, the multi-factor condition may stipulate that both mobile devices 16, 18 (e.g., factors) be present in order for the vehicle function in question to be available to the user. In such a case, if the first proximity status indicates that the first mobile device 16 is present but the second proximity status indicates that the second mobile device 18 is not present, the multi-factor condition would not be satisfied. Similarly, if the second proximity status indicates that the second mobile device 18 is present but the first proximity status indicates that the first mobile device 16 is not present, the multi-factor condition would also not be satisfied.

Other conditions, such as time-based or location-based conditions may also be used. For example, if the user profile stipulates that the user in question (or all users if a global policy and/or default profile is implemented) is to operate the vehicle within a certain radius of a particular location (e.g., street address) and it is determined that the vehicle is outside that radius, the denial component 36 may deny operation of the vehicle (e.g., prevent ignition of the vehicle, shutdown the vehicle after providing a warning to the driver, etc.). By way of another example, if the user profile stipulates that the user in question is to operate the vehicle within a certain time period and it is determined that the current time is outside the specified time period, the denial component 36 may also deny operation of the vehicle. In addition, enforcement of the multi-factor conditions may be conducted on an ongoing basis. For example, if it is determined that, after a given user request has been granted, a condition leading to the grant of the request is no longer satisfied, the grant of the condition may be effectively reversed. Thus, shutdown of the vehicle may be implemented in such a scenario as well. Other examples may include the prohibition of radio usage while the vehicle is being operated to prevent distracted driver scenarios.

The security module 24c may also have a grant component 38 that grants user requests if the first proximity status and the second proximity status satisfy the multi-factor condition of the user profile. As will be discussed in greater detail, the grant component 38 may also apply one or more constraints such as, for example, a time constraint, location constraint, login constraint, etc., of the user profile to the vehicle function in question. With specific regard to the login constraint, the illustrated architecture 24 also includes a pairing module 24d configured to pair the first and second mobile devices 16, 18, as well as replacement devices such as device 20 (FIG. 2A) and device 22 (FIG. 2B), with the vehicle. The mobile devices 16, 18, and replacement devices 20 (FIG. 2A), 22 (FIG. 2B) may also be paired with one another. If both factors are present, the pairing module 24d may manage the pairing process normally. If, on the other hand, only one of the factors is present, the pairing module 24d may permit entry to the vehicle and then prompt the user to enter a passcode (e.g., personal identification number/PIN, password, etc.) before proceeding with the pairing process.

With further regard to the pairing module 24d, the passcode may be entered on one of the mobile devices 16, 18, or in some embodiments may be required to be entered directly into the vehicle UI 34 in order to pair the devices 16, 18. In another embodiment, automatic pairing may be enabled, wherein a default policy and/or user profile may be used until a "master" (e.g., primary) device is defined. For example, one device may be considered to be a master that is to be present in order to pair other devices together and with the vehicle (one master key fob, for instance). In some embodiments, pairing may only be completed when the master device is also present (e.g., in order to pair a lesser privileged smart phone, for instance, operated by a child, minor, or other non-owner of the vehicle and a smart phone). In some embodiments, a second device (e.g., smart phone rather than key fob) may be identified as a master device at the time of pairing to enable entry of user constraints on other secondary devices. These other secondary "non-master" devices (e.g., lesser privileged smart phone) may be prevented from changing their own user constraints. Secondary devices may receive user constraints to be stored on the device via a number of means: Bluetooth, wireless, NFC (near field communication), synching to computer or other docking station, etc. The user constraints may then be non-modifiable, however except in the presence of the master device.

Additionally, the illustrated security module 24c has a notification component 42 configured to generate a notification via the UI 30 of the first mobile device 16, the UI 32 of the second mobile device 18, and/or the UI 34 of the vehicle if either the first proximity status indicates that the first mobile device is not present or the second proximity status indicates that the second mobile device is not present. More particularly, such a notification may be useful in cases where a bona fide user is attempting to operate the vehicle without one of the factors (e.g., forgotten factor is missing) as well as cases where an unauthorized user is attempting to operate the vehicle without one of the factors (e.g., stolen factor is present). The notification may be sent to the nearby factor (e.g., in the case of a forgotten factor) and/or the missing factor (e.g., in the case of a stolen factor), depending upon the circumstances.

In the illustrated example, each of the mobile devices 16, 18, includes a policy repository 17 to store a policy that has one or more multi-factor conditions, as well as a wireless interface 19 to receive a request from the security module 24c of the vehicle and transmit the policy to the security module 24c in response to the request. In one example, the policy is a user profile. As already noted, a given multi-factor condition may indicate whether the functions 26 of the vehicle are to be accessible if either the first mobile device 16 or the second mobile device 18 are not in proximity of the vehicle during an attempted access of the functions 26 of the vehicle. The policy may be transmitted to the security module 24c in conjunction with a pairing process and/or an attempt to access one or more of the functions 26 of the vehicle.

With further regard to the pairing process, the illustrated mobile devices 16, 18 also include a pairing module 21 that is configured to pair the respective device with the vehicle and/or other devices. In one example, the pairing module 21 of the first mobile device 16 receives a passcode via the UI 30 and determines whether the passcode satisfies a login constraint of the policy, wherein the first mobile device 16 is paired if the passcode satisfies the login constraint. Similarly, the pairing module 21 of the second mobile device 18 may receive a passcode via the UI 32 and determine whether the passcode satisfies the login constraint of the policy, wherein the second mobile device 18 is paired if the passcode satisfies the login constraint. Alternatively, the determination as to whether the passcode satisfies the login constraint may be conducted by the vehicle. Moreover, in some instances, a mobile device such as, for example, the first mobile device 16 (e.g., key fob) may not have the capability to support the entry of login credentials. In such a case, the UI 34 of the vehicle may be used, or the login process may be bypassed altogether if the device is a master device.

Figure 4:
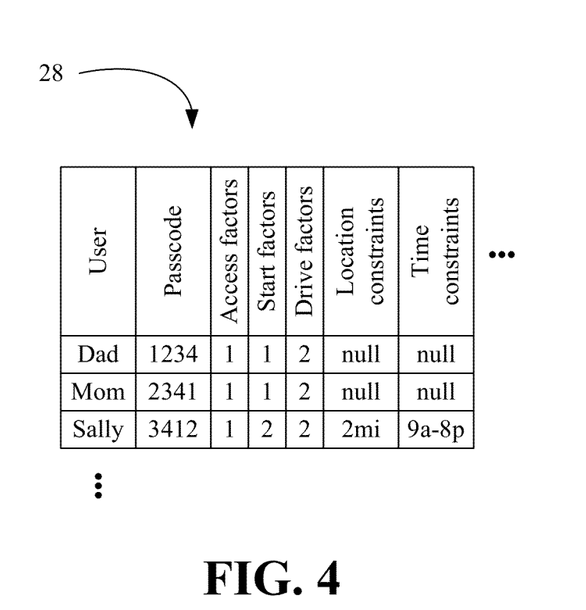
FIG. 4 is a block diagram of an example of a set of user profiles according to an embodiment.

FIG. 4 shows a set of user profiles 28 structured as a table. In the illustrated example, a plurality of users (e.g., "Dad", "Mom", "Sally") each has various preferences that are programmable/configurable. For example, a passcode, the number of factors required to access the vehicle ("Access Factors"), the number of factors required to activate the vehicle ignition ("Start Factors"), the number of factors required to operate the vehicle ("Drive Factors"), location constraints, time constraints, and so forth, may all be defined on a user-by-user basis. Moreover, the specified parameters may be used to determine whether to grant user requests, as well as to apply user-specific conditions to granted requests. Of particular note is that different users may have different policies. For example, Mom and Dad are able to start the vehicle with only one factor present, whereas Sally's profile calls for two factors to be present in order to start the vehicle, in the illustrated example. Although the illustrated set of user profiles 28 is structured as a table, the set of user profiles 28 may also utilize other known structures such as relational database structures and/or linked lists to track, manage, control and organize the data represented therein.

Figure 5:
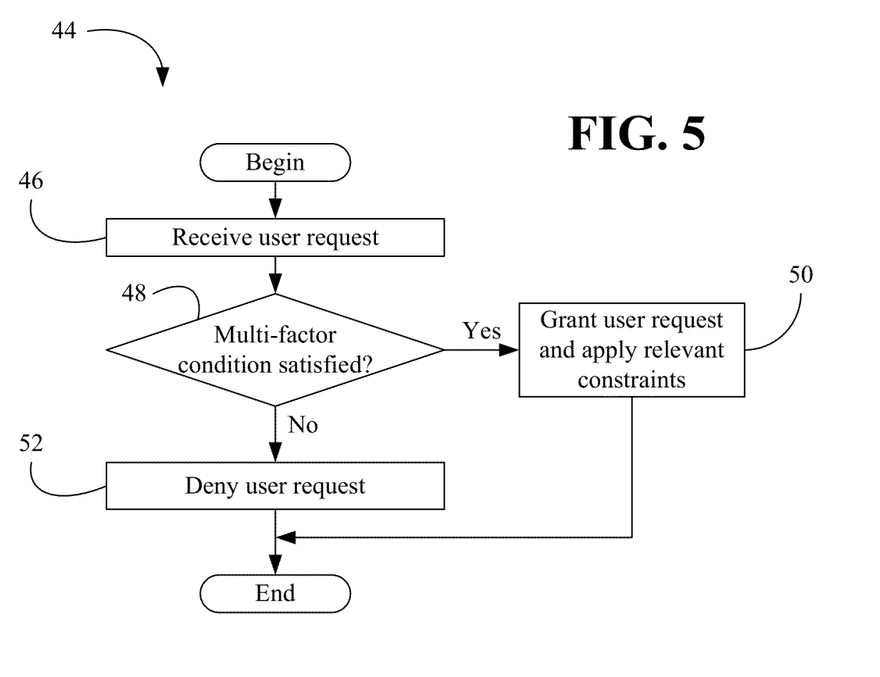
FIG. 5 is a flowchart of an example of a method of managing a multi-factor authentication environment according to an embodiment.

Turning now to FIG. 5, a method 44 of managing a multi-factor authentication environment is shown. The method 44 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 44 may be written in any combination of one or more programming languages, including an object oriented programming language such as C++ or the like and conventional procedural programming languages, such as the "C" programming language or similar programming languages. Moreover, the method 44 may be implemented as the logic architecture 24 (FIG. 3) using any of the aforementioned circuit technologies.

Illustrated processing block 46 provides for receiving a user request via a user interface of, for example, a first mobile device, a second mobile device, a vehicle, and so forth. The user request may correspond to one or more functions of the vehicle such as a door unlock function (e.g., access request), an ignition function (e.g., start request), a user setting function (e.g., seat preferences, radio preferences), a vehicle operation function (e.g., placing/maintaining the transmission in drive), a pairing function (e.g., replacement device), and so forth. A determination may be made at block 48 as to whether a multi-factor condition is satisfied. As already noted, the multi-factor condition may take into consideration a first proximity status of a first mobile device with respect to the vehicle, a second proximity status of a second mobile device with respect to the vehicle, etc., wherein the multi-factor condition may specify whether both mobile devices are to be present in order to make the vehicle function in question available to the user. If the multi-factor condition is not satisfied, block 52 may deny the user request. Block 52 may also provide for generating a notification via user interface of, for example, the first mobile device, the second mobile device, the vehicle, or any combination thereof, in order to inform the vehicle owner of a missing, lost and/or stolen mobile device, as already discussed.

If, on the other hand, the multi-factor condition is satisfied, illustrated block 50 grants the user request and applies any relevant constraints to the request. Both the multi-factor condition and the constraints may be defined on a user-by-user basis and stored in an appropriate profile, policy, etc. In one example, the constraint is a location constraint in which the vehicle function is only available in certain locations. In another example, the constraint is a time constraint in which the vehicle function is only available at certain times and/or for certain durations of time. In yet another example, the constraint is a login constraint in which the vehicle function is only available if the user inputs a predetermined passcode. The login constraint may be particularly useful for pairing devices and replacement devices.

Figure 6:
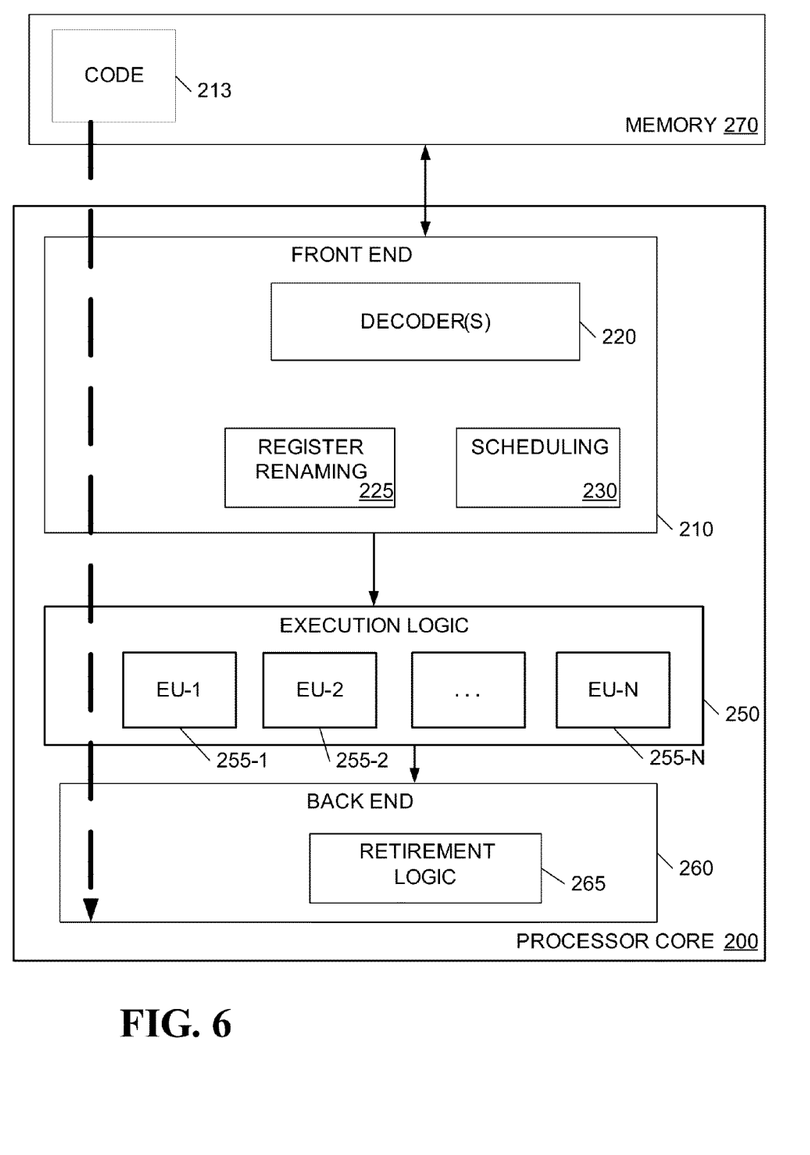
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 24 (FIG. 3), already discussed. The processor core 200 follows a program sequence of instructions indicated by the code 213. Thus, the processor core 200 may be part of a vehicle such as the vehicle 14 (FIG. 1). The processor core 200 may also be used in a mobile device such as the mobile devices 16, 18 (FIG. 3) to support the functionality of those devices. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
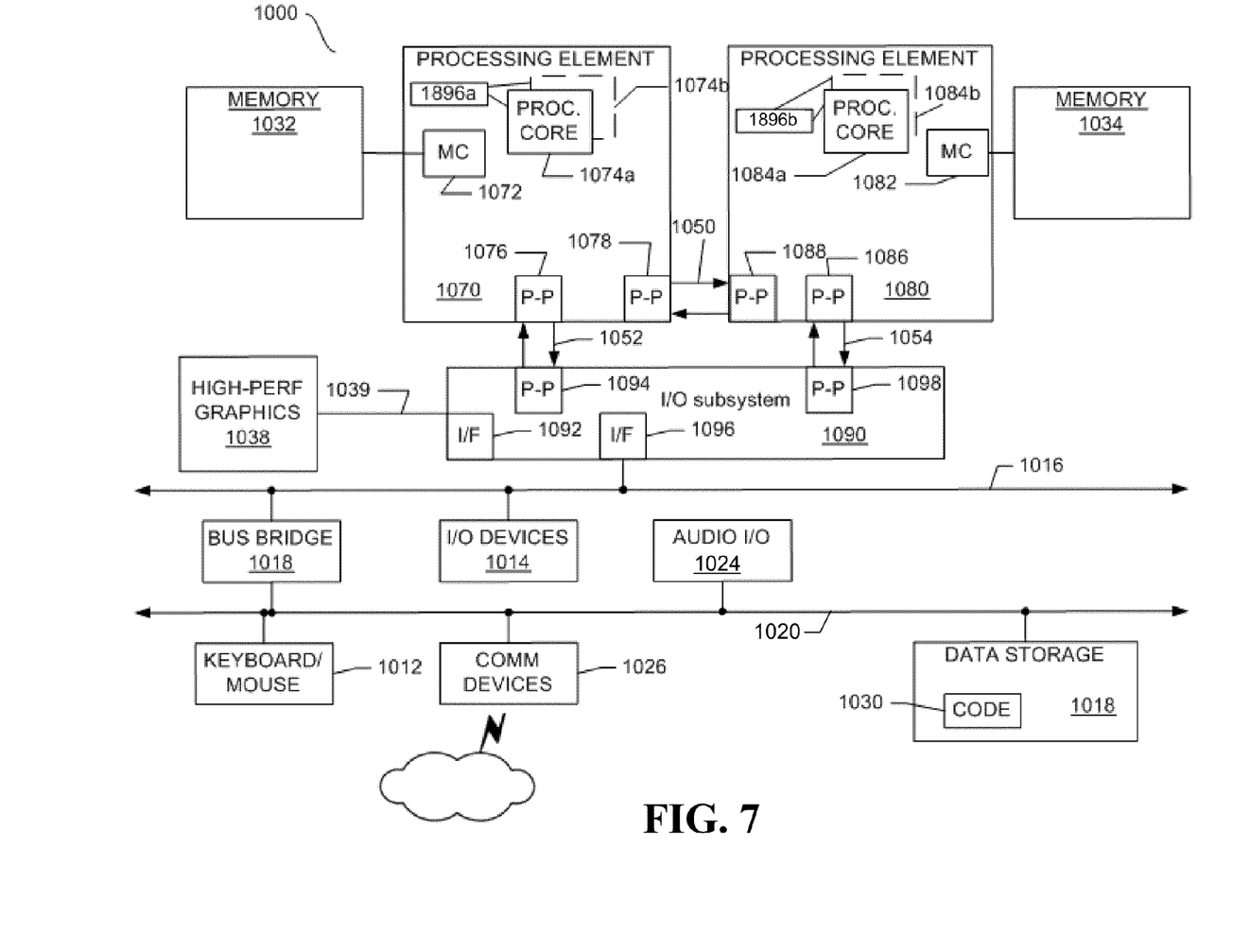
FIG. 7 is a block diagram of an example of a system according to an embodiment.

Referring now to FIG. 7, shown is a block diagram of a system 1000 in accordance with an embodiment of the present invention. In one example, the system 1000 is part of a vehicle such as the vehicle 14, already discussed. The system 1000 may also be used in a mobile device such as the mobile devices 16, 18 (FIG. 3) to support the functionality of those devices. Shown in FIG. 7 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 6.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 (e.g., computer readable medium, computer readable storage medium, etc.) for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070 and 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 7, various I/O devices 1014 may be coupled to the first bus 1016, along with a bus bridge 1018 which may couple the first bus 1016 to a second bus 1020. The I/O devices 1014 may include, for example, one or more proximity sensors that may be used to determine the proximity status of mobile devices with respect to a vehicle. For example, the proximity sensors may incorporate near field communications (NFC) technology, radio frequency identifier (RFID) technology, infrared (IR) technology, and so forth. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network, not shown), and a data storage unit 1018 such as a disk drive or other mass storage device which may include code 1030, in one embodiment. The code 1030 may include instructions for performing embodiments of one or more of the methods described above. Thus, the illustrated code 1030 may implement the logic architecture 24 (FIG. 3) and may be similar to the code 213 (FIG. 6), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Technologies described herein may therefore reduce cost by enabling general purpose devices such as smart phones, smart tables, etc., to be used for authentication purposes in a vehicle context. In addition, delays associated with replacing lost or stolen authentication devices may be significantly reduced due to the ability to pair a wide variety of devices with the vehicle on-the-fly. Moreover, the use of customizable profiles and/or policies to apply security constraints may be much more convenient to users and may substantially enhance the user experience. In addition, the mobile devices may be configured to communicate directly with the vehicle so that proximity status information can be determined between a general purpose mobile device and the vehicle without involving an intermediary such as a server and/or service provider.

Examples may include an apparatus having a first factor module to determine a first proximity status of a first mobile device with respect to a vehicle and a second factor module to determine a second proximity status of a second mobile device with respect to the vehicle. The apparatus may also include a security module to configure an accessibility of one or more functions of the vehicle based at least in part on the first proximity status and the second proximity status.

Additionally, the security module may identify a policy associated with one or more of the first mobile device and the second mobile device, wherein the accessibility is to be configured further based on the policy.

Additionally, the security module may receive a user request via a user interface of one or more of the first mobile device, the second mobile device and the vehicle, wherein the accessibility is to be configured in response to the user request.

Moreover, the security module may include a denial component to deny the user request if the first proximity status and the second proximity status do not satisfy a multi-factor condition of the policy.

In addition, the security module may include a grant component to grant the user request if the first proximity status and the second proximity status satisfy a multi-factor condition of the policy.

In addition, the grant component may apply one or more of a time constraint of the policy, a location constraint of the policy, and a login constraint of the policy to at least one of the one or more functions of the vehicle.

Moreover, the security module may include a notification component to generate a notification via a user interface of one or more of the first mobile device, the second mobile device and the vehicle if either the first proximity status indicates that the first mobile device is not present or the second proximity status indicates that the second mobile device is not present.

Additionally, at least one of the one or more functions of the vehicle may include one or more of a door unlock function, a trunk unlock function, an ignition function, a user setting function, a vehicle operation function, and a replacement device pairing function.

Additionally, any of the aforementioned apparatus examples may further include a proximity sensor, wherein the first factor module is to use the proximity sensor to determine the first proximity status and the second factor module is to use the proximity sensor to determine the second proximity status.

Examples may also include a method in which a first proximity status of a first mobile device is determined with respect to a vehicle. The method may also provide for determining a second proximity status of a second mobile device with respect to the vehicle, and configuring an accessibility of one or more functions of the vehicle based at least in part on the first proximity status and the second proximity status.

Additionally, the method may further include identifying a policy associated with one or more of the first mobile device and the second mobile device, wherein the accessibility is configured further based on the policy.

Additionally, the method may further include receiving a user request via a user interface of one or more of the first mobile device, the second mobile device and the vehicle, wherein the accessibility is configured in response to the user request.

Moreover, configuring the accessibility may include denying the user request if the first proximity status and the second proximity status do not satisfy a multi-factor condition of the policy.

In addition, configuring the accessibility may include granting the user request if the first proximity status and the second proximity status satisfy a multi-factor condition of the policy.

In addition, configuring the accessibility may further include applying one or more of a time constraint of the policy, a location constraint of the policy, and a login constraint of the policy to at least one of the one or more functions of the vehicle.

Moreover, configuring the accessibility may include generating a notification via a user interface of one or more of the first mobile device, the second mobile device and the vehicle if either the first proximity status indicates that the first mobile device is not present or the second proximity status indicates that the second mobile device is not present.

Additionally, in any of the aforementioned method examples, at least one of the one or more functions of the vehicle may include one or more of a door unlock function, a trunk unlock function, an ignition function, a user setting function, a vehicle operation function, and a replacement device pairing function.

Examples may also include at least one machine readable storage medium having a set of instructions which, when executed by a processor, cause a vehicle to perform any of the aforementioned method examples.

Moreover, examples may include a system having a proximity sensor and a first factor module to use the proximity sensor to determine a first proximity status of a first mobile device with respect to a vehicle. The system may also have a second factor module to use the proximity sensor to determine a second proximity status of a second mobile device with respect to the vehicle, and a security module to configure an accessibility of one or more functions of the vehicle based at least in part on the first proximity status and the second proximity status.

Examples may also include a mobile device having a policy repository to store a policy with a multi-factor condition. The mobile device may also include a wireless interface to receive a request from a security module of a vehicle and transmit the policy to the security module in response to the request.

Additionally, the multi-factor condition may indicate whether one or more functions are to be accessible if either the first mobile device or a second mobile device are not in proximity of the vehicle.

Additionally, the mobile device may further include a pairing module to pair the first mobile device with the vehicle.

Moreover, the pairing module may receive a passcode via a user interface of the first mobile device, wherein the first mobile device is to be paired with the vehicle only if the passcode satisfies a login constraint of the policy.

In addition, the wireless interface may receive a notification that the first mobile device is a master device, wherein the policy is to include a plurality of user profiles.

In addition, the wireless interface of any of the aforementioned mobile device examples may receive a notification that either the first mobile device or the second mobile device is not within proximity of the vehicle during an attempted access of one or more functions of the vehicle.

Examples may also include at least one machine readable storage medium comprising a set of instructions which, when executed by a processor, cause a first mobile device to perform methods of any of the aforementioned mobile device examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. At least one non-transitory machine readable storage medium comprising a set of instructions which, when executed by a processor, cause a first mobile device to:
   store a policy including a multi-factor condition that is to include a number uniquely configured for a user stating how many devices are to be required to allow a function of a vehicle to be accessible to the user;
   receive a request from a security module of the vehicle; and
   transmit the policy to the security module in response to the request.

2. The at least one medium of claim 1, wherein the multi-factor condition is to indicate whether the one or more functions are to be accessible if either the first mobile device or a second mobile device are not in proximity of the vehicle.

3. The at least one medium of claim 1, wherein the instructions, when executed, cause the first mobile device to pair the first mobile device with the vehicle.

4. The at least one medium of claim 3, wherein the instructions, when executed, cause the first mobile device to receive a passcode via a user interface of the first mobile device, and wherein the first mobile device is to be paired with the vehicle only if the passcode satisfies a login constraint of the policy.

5. The at least one medium of claim 1, wherein the instructions, when executed, cause the first mobile device to receive a notification that the first mobile device is a master device, and wherein the policy is to include a plurality of user profiles.

6. The at least one medium of claim 1, wherein the instructions, when executed, cause the first mobile device to receive a notification that either the first mobile device or a second mobile device is not within proximity of the vehicle during an attempted access of one or more functions of the vehicle.

7. At least one non-transitory machine readable storage medium comprising a set of instructions which, when executed by a processor, cause a vehicle to:
   determine a first proximity status of a first mobile device with respect to the vehicle;
   determine a second proximity status of a second mobile device with respect to the vehicle;
   configure an accessibility of one or more functions of the vehicle based at least in part the first proximity status and the second proximity status; and
   identify a policy associated with one or more of the first mobile device and the second mobile device, wherein the accessibility is to be configured further based on the policy, wherein the policy is to include a number uniquely configured for a user stating how many devices are to be required to allow a function of the vehicle to be accessible to the user.

8. The at least one machine readable storage medium of claim 7, wherein the instructions, when executed, cause the vehicle to receive a user request via a user interface of one or more of the first mobile device, the second mobile device and the vehicle, wherein the accessibility is be configured in response to the user request.

9. The at least one machine readable storage medium of claim 8, wherein the instructions, when executed, cause the vehicle to deny the user request if the first proximity status and the second proximity status do not satisfy a multi-factor condition of the policy that is to include the number.

10. The at least one machine readable storage medium of claim 8, wherein the instructions, when executed, cause the vehicle to grant the user request if the first proximity status and the second proximity status satisfy a multi-factor condition of the policy that is to include the number.

11. The at least one machine readable storage medium of claim 7, wherein the instructions, when executed, cause the vehicle to apply one or more of a time constraint of the policy, a location constraint of the policy, and a login constraint of the policy to at least one of the one or more functions of the vehicle.

12. The at least one machine readable storage medium of claim 7, wherein the instructions, when executed, cause the vehicle to generate a notification via a user interface of one or more of the first mobile device, the second mobile device and the vehicle to announce that either the first mobile device is not present or the second mobile device is not present.

13. The at least one machine readable storage medium of claim 7, wherein at least one of the one or more functions of the vehicle includes one or more of a door unlock function, a trunk unlock function, an ignition function, a user setting function, a vehicle operation function, and a replacement device pairing function.

14. An apparatus comprising:
   a first factor module to determine a first proximity status of a first mobile device with respect to a vehicle;
   a second factor module to determine a second proximity status of a second mobile device with respect to the vehicle; and
   a security module to configure an accessibility of one or more functions of the vehicle based at least in part the first proximity status and the second proximity status, the security module further to identify a policy associated with one or more of the first mobile device and the second mobile device, wherein the accessibility is to be configured further based on the policy, wherein the policy is to include a number uniquely configured for a user stating how many devices are to be required to allow a function of the vehicle to be accessible to the user.

15. The apparatus of claim 14, wherein the security module further to receive a user request via a user interface of one or more of the first mobile device, the second mobile device and the vehicle, wherein the accessibility is to be configured in response to the user request.

16. The apparatus of claim 15, wherein the security module includes a denial component to deny the user request if the first proximity status and the second proximity status do not satisfy a multi-factor condition of the policy that is to include the number.

17. The apparatus of claim 15, wherein the security module includes a grant component to grant the user request if the first proximity status and the second proximity status satisfy a multi-factor condition of the policy that is to include the number.

18. The apparatus of claim 14, wherein the grant component further to apply one or more of a time constraint of the policy, a location constraint of the policy, and a login constraint of the policy to at least one of the one or more functions of the vehicle.

19. The apparatus of claim 14, wherein the security module includes a notification component to generate a notification via a user interface of one or more of the first mobile device, the second mobile device and the vehicle to announce that either the first mobile device is not present or the second mobile device is not present.

20. The apparatus of claim 14, wherein at least one of the one or more functions of the vehicle is to include one or more of a door unlock function, a trunk unlock function, an ignition function, a user setting function, a vehicle operation function, and a replacement device pairing function.

21. The apparatus of claim 14, further including a proximity sensor, wherein the first factor module further to use the proximity sensor to determine the first proximity status and the second factor module is to use the proximity sensor to determine the second proximity status.

22. A mobile device comprising:
a policy repository to store a policy including a multi-factor condition that is to include a number uniquely configured for a user stating how many devices are to be required to allow a function of a vehicle to be accessible to the user; and
a wireless interface to receive a request from a security module of the vehicle and transmit the policy to the security module in response to the request.

23. The mobile device of claim 22, wherein the multi-factor condition further to indicate whether the one or more functions are to be accessible if either the first mobile device or a second mobile device are not in proximity of the vehicle.

24. The mobile device of claim 22, further including a pairing module to pair the first mobile device with the vehicle.

25. The mobile device of claim 24, wherein the pairing module further to receive a passcode via a user interface of the first mobile device, and wherein the first mobile device is to be paired with the vehicle only if the passcode satisfies a login constraint of the policy.

26. The mobile device of claim 22, wherein the wireless interface further to receive a notification that the first mobile device is a master device, and wherein the policy is to include a plurality of user profiles.

27. The mobile device of claim 22, wherein the wireless interface further to receive a notification that either the first mobile device or the second mobile device is not within proximity of the vehicle during an attempted access of one or more functions of the vehicle.

28. The at least one machine readable storage medium of claim 11, wherein the time constraint is to include a period of time uniquely configured for the user within which the user is to be allowed to access the function, and the location constraint to include a geographic location uniquely configured for the user within which the user is to be allowed to access the function.

29. The at least one machine readable storage medium of claim 1, wherein two or more users are each to be associated with a uniquely configured number of equal value for a same function and with a different uniquely configured constraint, and two or more users are each to be associated with a uniquely configured number of equal value for a same function and with a same uniquely configured constraint.

* * * * *